United States Patent [19]

Hollenbach et al.

[11] 4,368,213

[45] Jan. 11, 1983

[54] EMULSION CONCENTRATE FOR PALATABLE POLYESTER BEVERAGE

[75] Inventors: Edward J. Hollenbach, Brookville, Ind.; Norman B. Howard, Oxford, Ohio

[73] Assignee: The Procter & Gamble Company, Cincinnati, Ohio

[21] Appl. No.: 276,558

[22] Filed: Jun. 23, 1981

[51] Int. Cl.³ .................... A23D 5/00; A23L 2/00; A61K 31/225
[52] U.S. Cl. .................... 426/590; 426/602; 426/612; 426/613; 424/180
[58] Field of Search ............ 426/590, 602, 606, 611, 426/612, 613, 654; 424/180, 313

[56] References Cited

U.S. PATENT DOCUMENTS

| | | | |
|---|---|---|---|
| 2,808,336 | 1/1957 | Kalish | 426/602 |
| 3,600,186 | 8/1971 | Mattson et al. | 426/611 |
| 4,005,195 | 1/1977 | Jandacek | 426/658 |
| 4,279,941 | 7/1981 | Bosco et al. | 426/602 |

*Primary Examiner*—Raymond N. Jones
*Assistant Examiner*—Elizabeth J. Curtin
*Attorney, Agent, or Firm*—S. J. Goldstein; J. D. Schaeffer; R. C. Witte

[57] ABSTRACT

A concentrated emulsion of non-absorbable liquid polyol polyesters and high melting fatty acids or esters thereof in water can be diluted to a highly palatable beverage. The emulsifier system comprises a polyglycerol ester and an aliphatic glycol ester. The beverage provides the hypercholesteremic or obese patient with a highly agreeable vehicle for his daily requirement of non-absorbable liquid polyol polyester.

16 Claims, No Drawings

//  4,368,213

EMULSION CONCENTRATE FOR PALATABLE POLYESTER BEVERAGE

TECHNICAL FIELD

The present invention relates to a dietary beverage concentrate comprising an emulsion of non-absorbable, non-digestible liquid polyol polyesters which, on dilution, provides a highly palatable milkshake-like beverage.

Certain sugar fatty acid polyesters and sugar alcohol fatty acid polyesters (generally referred to as polyol polyesters) are known as non-absorbable, non-digestible replacements of fats in the human diet. Replacement of a substantial portion of the fat in an individual's diet with these sugar esters results in a significant reduction of caloric intake. However, this requires that a whole line of food product be prepared wherein fat is replaced with polyol polyesters. When taken before meals, the polyol polyesters have a satiety effect and thus help reduce the caloric intake.

The polyol polyesters referred to hereinabove are also known to reduce the body's absorption of cholesterol thereby providing a means for treating hypercholesterolemia. For a successful treatment of hypercholesterolemia, three to six dosages of 125 mg polyol polyester per kg bodyweight are required. In certain cases, dosages of up to 500 mg/kg are necessary. A hypercholestorolemic patient weighing 75 kg (many patients suffering from hypercholesterolemia weigh much more) faces the daily task of swallowing from 3 to 6 doses polyol polyester of up to 37.5 g each. The polyol polyesters must be mixed with long chain fatty acid esters of glycerol in a ratio of 4:1, to prevent leakage of the liquid sugar polyester through the anal sphincter. Hence, one dose of the anti-hypercholesterolemic composition contains up to 47 g of fat and fat-like material. Prior to this invention no palatable dosage form of such quantities of polyol polyesters and their mixtures with anti-anal leakage agents was available.

It has been found that palatable dosage forms can be provided by emulsifying the polyol polyesters in water. Many emulsifiers suitable for concentrated oil-in-water type emulsions are commercially available. However, although the liquid polyol polyesters are suitable fat replacements in many food compositions, their physical properties are quite different from those of triglyceride fats. An important example thereof is the relative polar character of polyol polyester molecules as compared to triglyceride molecules. As a consequence, many emulsifiers suitable for triglyceride-in-water emulsions are not capable of forming polyol polyester emulsions of sufficient stability. An emulsifier to be used in polyol polyester-in-water emulsions preferably is sufficiently hydrophilic as to form a hydrated mesomorphic phase below its melting point to obtain the required emulsion stability. Nevertheless, the emulsifier system must be capable of forming stable emulsions of high melting triglycerides (the anti-anal leakage agent). This presents a challenging problem of conflicting requirements which has not heretofore been addressed by workers in the art.

It has now been discovered that the combination of a polyglycerol ester and an aliphatic glycol ester provides an emulsifier system capable of forming a stable emulsion concentrate of liquid polyol polyester and anti-anal leakage agent in water, which can readily be diluted to form a highly palatable beverage.

This invention provides a highly palatable emulsion of polyol polyester and anti-anal leakage agent in the form of a milkshake-like beverage. The obese or hypercholesterolemic patient can take his daily dose of polyol polyester without feeling the phychological aversion often seen in patients required to take medicine over a long period of time, and without developing a revulsion against the dosage form.

This invention further provides a highly concentrated emulsion of polyol polyester and anti-anal leakage agent which, on dilution with milk, water, fruit juice, and the like, forms a milkshake-like beverage. The concentrated form provides convenience of handling and storage. By using the diluent of his choice, the patient can tailor his milk drink to his personal taste, and by varying the diluent he can bring variation in the daily routine.

BACKGROUND REFERENCES

The following references provide the background relevant to the present invention.

U.S. Pat. No. 3,600,186 (1971) to Mattson and Volpenhein discloses low calorie food compositions containing polyol polyesters of the general type employed herein. No beverages or concentrated emulsions are disclosed in this reference.

U.S. Pat. No. 4,005,195 (1977) to Jandacek relates to compositions comprising polyol polyesters and an anti-anal leakage agent to provide pharmaceutical and food compositions for treating and/or preventing hypercholesterolemia while avoiding undesired anal leakage of the liquid polyesters. The disclosed pharmaceutical dosage compositions contain relatively small amounts of sugar polyester (up to 3.5 g) which would require the patient to ingest ten or more capsules, 3 to 6 times a day.

U.S. Pat. No. 2,808,336 (1957) to Kalish discloses oral fat emulsions comprising refined coconut oil and monostearate emulsifiers to provide a palatable drink for ill or convalescent patients in need of high calorie, easily digestible food.

SUMMARY OF INVENTION

The present invention relates to a concentrated emulsion of a mixture of non-absorbable liquid polyol polyesters with fatty acids having a melting point of ca 37° C. or higher, or esters of such fatty acids which, on dilution, forms a highly palatable milkshake-like beverage. The beverage of this invention enables obese and hypercholesterolemic patients to ingest large daily requirements of liquid polyol polyesters without developing an aversion. As the concentrated emulsion can readily be diluted with milk, fruit juice, lemonade and the like, the patient can tailor the beverage to his taste and bring variety into his ingestion routine.

DETAILED DESCRIPTION OF THE INVENTION

This invention provides a concentrated emulsion of non-absorbable liquid polyol polyesters which can be readily diluted with protein containing liquids like milk, or protein-free liquids like fruit juice or lemonade. The beverage concentrate of this invention comprises:

(a) from about 35% to about 60% of a non-absorbable, non-digestible liquid polyol fatty acid polyester having at least 4 fatty acid ester groups, wherein the polyol is selected from the group consisting of sugars and sugar alcohols containing from 4 to 8 hydroxyl groups and wherein each fatty acid group has from about 8 to about 22 carbon atoms; and (b) from about 10% to about 50% by weight of the polyol fatty acid polyester of a fatty acid having a melting point of 37° C. or higher, or esters of such fatty acids to prevent leakage of said liquid polyester through the anal sphincter; and (c) from about 0.5% to about 3% of a polyglycerol fatty acid ester emulsifier having an average of from 2 to 10 glycerol units and from 1 to 3 fatty acyl groups of from 14 to 18 carbon atoms per glycerol unit; and (d) from about 0.5% to about 3% of a fatty acid mono ester of an aliphatic diol having from about 3 to about 5 carbon atoms in the diol moiety; and (e) from about 5% to about 15% of a mono- or disaccharide; and (f) the balance water.

"Percentage" and "%" as used herein means weight percentage or weight %, unless otherwise indicated.

Liquid Polyesters

The liquid polyol fatty acid polyesters (or, simply, polyesters) employed in this invention comprise certain polyols, especially sugars or sugar alcohols, esterified with at least four fatty acid groups. Accordingly, the polyol starting material must have at least four esterifiable hydroxyl groups. Examples of preferred polyols are sugars, including monosaccharides and disaccharides, and sugar alcohols. Examples of monosaccharides containing four hydroxyl groups are xylose and arabinose and the sugar alcohol derived from xylose, which has five hydroxyl groups, i.e., xylitol. (The monosaccharide erythrose is not suitable in the practice of this invention since it only contains three hydroxyl groups, but the sugar alcohol derived from erythrose, i.e., erythritol, contains four hydroxyl groups and accordingly can be used). Suitable five hydroxyl group-containing monosaccharides are galactose, fructose, and sorbose. Sugar alcohols containing six OH groups derived from the hydrolysis products of sucrose, as well as glucose and sorbose, e.g. sorbitol, are also suitable. Examples of disaccharide polyols which can be used include maltose, lactose, and sucrose, all of which contain eight hydroxyl groups.

Preferred polyols for preparing the polyesters for use in the present invention are selected from the group consisting of erythritol, xylitol, sorbitol, glucose and sucrose. Sucrose is especially preferred.

The polyol starting material having at least four hydroxyl groups must be esterified on at least four of the —OH groups with a fatty acid containing from about 8 to about 22 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic acid. The fatty acids can be derived from naturally occurring or synthetic fatty acids; they can be saturated or unsaturated, including positional and geometrical isomers. However, in order to provide liquid polyesters of the type used herein, at least about half of the fatty acid incorporated into the polyester molecule must be unsaturated. Oleic and linoleic acids, and mixtures thereof, are especially preferred.

The liquid polyol fatty acid polyesters useful in this invention must contain at least four fatty acid ester groups. Polyol fatty acid polyester compounds that contain three or less fatty acid ester groups are digested in and the products of digestion are absorbed from the intestinal tract much in the manner of ordinary triglyceride fats, whereas the polyol fatty acid polyester compounds that contain four or more fatty acid ester groups are substantially non-digestible and consequently non-absorbable by the human body. It is not necessary that all of the hydroxyl groups of the polyol be esterified with fatty acid, but it is preferable that the polyester contain no more than two unesterified hydroxyl groups. Most preferably, substantially all of the hydroxyl groups of the polyol are esterified with fatty acid, i.e., the compound is substantially completely esterified. The fatty acids esterified to the polyol molecule can be the same or mixed (but, as noted above, a substantial amount of the unsaturated acid ester groups must be present to provide liquidity).

To illustrate the above points, a sucrose fatty triester would not be suitable for use herein because it does not contain the required four fatty acid ester groups. A sucrose tetra-fatty acid ester would be suitable, but is not preferred because it has more than two unesterified hydroxyl groups. A sucrose hexa-fatty acid ester would be preferred because it has no more than two unesterified hydroxyl groups. Highly preferred compounds in which all the hydroxyl groups are esterified with fatty acid include the liquid sucrose octa-fatty acid esters.

The following are non-limiting examples of specific liquid polyol fatty acid polyesters containing at least four fatty acid ester groups suitable for use in the present invention: glucose tetraoleate, the glucose tetraesters of soybean oil fatty acids (unsaturated), the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, sucrose tetraoleate, sucrose pentaoleate, sucrose hexaoleate, sucrose heptaoleate, sucrose octaoleate, and mixtures thereof.

As noted above, highly preferred polyol fatty acid esters are those wherein the fatty acids contain from about 14 to about 18 carbon atoms.

The polyol fatty acid polyesters suitable for use herein can be prepared by a variety of methods well known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. As an example, the preparation of polyol fatty acid esters is described in U.S. Pat. No. 2,831,854, granted Apr. 22, 1958 to Tucker, et al. incorporated herein by reference. Food compositions comprising non-absorbable sugar fatty acid esters are disclosed in U.S. Pat. No. 3,600,186, granted Aug. 17, 1971 to Mattson, et al., incorporated herein by reference.

Specific, but non-limiting, examples of the preparation of polyol fatty acid esters suitable for use in the practice of this invention are as follows.

Erythritol tetraoleate—Erythritol and a five-fold molar excess of methyl oleate are heated at 180° C., under vacuum, with agitation, in the presence of sodium methoxide catalyst over two reaction periods of several hours each. The reaction product (predominantly erythritol tetraoleate) is refined in petroleum ether and crystallized three times from several volumes of aceine at 1° C. acetone.

Xylitol pentaoleate—Xylitol and five-fold molar excess of methyloleate in dimethylacetamide (DMAC) solution are heated at 180° C. for five hours in the presence of sodium methoxide catalyst under vacuum. The product (predominately xylitol pentaoleate) is refined in petroleum ether solution and after being freed of petroleum ether, is separated as a liquid layer four times from acetone at ca. 1° C. and twice from alcohol at ca. 10° C.

Sorbitol hexaoleate is prepared by essentially the same procedure used to prepare xylitol pentaoleate except that sorbitol is substituted for xylitol.

Sucrose octaoleate is prepared by substantially the same procedure as that used to prepare erythritol tetraoleate except that sucrose is substituted for erythritol.

Anti-Anal Leakage Agents

By "anti-anal leakage agent" or "AAL agent" herein is meant those materials which prevent frank leakage of the liquid polyesters. The natural stool-softening effect of the polyesters is not substantially affected, nor is it a problem.

Fatty acids having a melting point of ca. 37° C. or higher, and ingestible, digestible sources of such fatty acids, effectively inhibit anal leakage of the liquid polyesters. Non-limiting examples of saturated fatty acids and sources thereof which can be used as the anti-anal leakage agent herein include the free saturated fatty acids per se, compounds such as esters (e.g. triglycerides) that yield such saturated fatty acids on hydrolysis in the gut, soaps of the fatty acids such as the sodium, potassium, etc., water-soluble soaps, as well as the calcium and magnesium water-insoluble soaps.

Sources of natural and synthetic fatty acids suitable for use as AAL agent in this invention are disclosed in U.S. Pat. No. 4,005,195, issued Jan. 25, 1977 to Jandacek, the disclosures of which are incorporated herein by reference.

Preferred AAL agents for use herein are hydrogenated palm oil, natural and synthetic cocoa butter, and the position specific edible triglycerides described in U.S. Pat. No. 3,809,711, issued May 7, 1974 to Yetter, incorporated herein by reference.

The AAL agent should be present in an amount equaling at least about 10% by weight of the liquid polyester. It is more preferred that the AAL agent equals at least about 20% by weight of the liquid polyester to ensure that anal leakage does not occur, even at high ingestion rates. Amounts of AAL agent of more than 50% of the weight of liquid polyester adversely affect the texture of the emulsion concentrate and the palatability of the beverage made therefrom, and are to be avoided. Preferred herein are amounts equaling from about 20% to about 30% of the weight of the liquid polyester.

Emulsifier System

The emulsifier system suitable for use in the present invention comprises mixtures of polyglycerol esters and esters of an aliphatic diol. The polyglycerol esters have an average of from 2 to 10 glycerol units and from 1 to 3 fatty acyl groups of from 14 to 18 carbon atoms per glycerol moiety. Preferred polyglycerol esters have an average of from 2 to 3 glycerol units and an average of 1 fatty acyl group with from 14 to 18 carbon atoms per glycerol unit. Preferred herein are saturated fatty acyl groups.

The aliphatic diol contains from about 3 to about 5 carbon atoms and is esterified with one fatty acid molecule. Preferred diol esters are propylene glycol monoesters, e.g. propylene glycol monostearate, propylene glycol monopalmitate, and mixtures thereof.

The saccharides suitable for use in this invention may be mono- or disaccharides. They not only have a sweetening effect, but also enhance the creamy flavor or texture of the composition. An insufficient amount of saccharide contributes to an undesirable fatty taste in the composition, while too much saccharide tends to mask the other desirable flavors. Moreover, saccharides impart caloric value to the composition, and their use should therefore be limited. Suitable levels of saccharide range from about 5% to about 15% by weight of the polyol polyester, preferably from about 8% to about 12%. The preferred saccharide is sucrose; however, sucrose can be mixed with or replaced by other saccharides such as dextrose, fructose, maltose, and corn syrup, or by artificial sweeteners such as saccharine, the cyclamates, etc.

In one embodiment of this invention the beverage concentrate comprises from about 35% to about 60% of polyol polyester, preferably from about 40% to about 45%; from about 8% to about 15% of a fatty acid having a melting point of ca 37° C. or higher, or an ester of such fatty acids, preferably from about 10% to about 12%; from about 0.5% to about 3% polyglycerol ester, preferably from about 1.5% to about 2%; from about 0.5% to about 3% of a fatty ester of an aliphatic diol, preferably from about 1.5% to about 2% from about 5% to about 15%, preferably from about 8% to about 12% of a saccharide, and the balance comprising water, and flavorings.

From about 40 to about 55 grams of the beverage concentrate is added to from about 120 to 135 grams of an edible liquid and mixed with a Waring blender to make up one dosage of milkshake-type beverage.

In another embodiment of this invention the beverage concentrate is a semi diluted concentrate comprising from about 16% to about 30% of the polyol polyester, preferably from about 20% to about 23%; from about 4% to about 8% of a fatty acid having a melting point of 37° C. or higher, or an ester of such fatty acids, preferably from about 5% to about 7%; from about 0.3% to about 1.5% polyglycerol ester, preferably from about 0.7% to about 1%; from about 0.3% to about 1.5% of a fatty ester of an aliphatic diol, preferably from about 0.7% to about 1%; from about 2% to about 7%, preferably from about 4% to about 6%, of a saccharide, and the balance comprising water and flavorings.

From about 80 to about 110 grams of the beverage concentrate will provide one dosage of milkshake-type beverage on dilution with from about 65 to about 95 grams fluid. The emulsion can be mixed with the fluid by simple with a spoon or shaking.

Additional ingredients such as stabilizers, antioxidants, coloring agents, etc. can be added to the emulsion concentrate. A suitable stabilizer is potassium sorbate, used at a level ranging from about 0.1% to about 0.2% by weight of the liquid polyol polyester, preferably from about 0.13% to about 0.16%. When potassium sorbate is used the pH of the emulsion needs to be brought below 7 by addition of a small amount of citric acid (ca. 0.1% by weight of the liquid polyol polyester). Additional small amounts of a gum (e.g. Xanthan gum or Lambda Carrageenan gum) offsets a waxy mouthfeel caused by the anti-anal leakage agent. Amounts in the order of 2 to 2.5% are generally sufficient.

Preferred embodiments of the beverage concentrate (I) and semi-diluted beverage concentrate (II) are given below.

| Ingredient | I (% w/w) | II (% w/w) |
|---|---|---|
| Water | 21.4–34.3 | 41.1–67.3 |
| Potassium Sorbate | 0.05–0.07 | 0.02–0.04 |
| Xantham Gum | 0.8–1.2 | 0.4–0.6 |
| Sucrose | 8–12 | 4–6 |
| Citric Acid | 0.03–0.05 | 0.02–0.04 |
| Polyglycerol Ester[1] | 1.5–2.0 | 0.7–1.0 |
| Propylene Glycol Mono Esters[2] | 1.5–2.0 | 0.7–1.0 |
| Sucrose Polyester[3] | 40–45 | 20–23 |
| Hardened Palm oil | 10–12 | 5–7 |
| Powdered Vanilla | 0.2–0.4 | 0.1–0.2 |
| Milk Protein | 3.5–4.2 | 1.7–2.1 |
| Flavorings | ca. 0.12 | ca. 0.06 |

[1]An average of from 2 to 3 glycerol units and an average of 1 fatty acyl group with from 14 to 18 carbon atoms per glycerol unit
[2]Propylene glycol palmitate (85% mono ester)
[3]A mixture of sucrose hexaoleate, sucrose heptaoleate and sucrose octaoleate.

The beverage concentrates of the present invention can conveniently be prepared in a Hobart mixer in the following way. To water at a temperature of about 65° C. are added all water-soluble ingredients and the polyglycerol ester. The polyol polyester and the high melting fatty acid (ester) may be added as a mixture, or separately. In both cases the temperature needs to be about equal to the temperature of the aqueous solution, i.e. 60°–65° C. The aliphatic glycol ester may be added together with the polyol polyester, or after the addition of the high melting fatty acid (ester). Prior to the addition of flavorings the mixture is cooled to a temperature below 30° C., to avoid loss of volatiles. Milk protein and vanilla are likewise added after the mixture has been cooled.

The beverage concentrates of the present invention provide palatable beverages on dilution with a liquid. Any edible liquid is suitable for use herein. Carbonated beverages are somewhat less desirable, because they tend to form a foam when mixed with the beverage concentrate. Particularly suitable edible liquids are liquid dairy products, water, fruit juices, lemonade, vitamin fortified fruit juice analogs like KOOL-AID, LEMON-AID, and TANG, coffee, tea, etc. Preferred herein are milk, water, lemonade, fruit juice, and mixtures thereof. When an acidic liquid, like a fruit juice, is used to make up the beverage, the emulsion preferably does not contain milk protein as the proteins tend to denaturate at low pH. The beverage concentrate can be mixed with the edible liquid in a weight ratio ranging from 1:2 to 1:3, preferably about 1:2.5. The semi-diluted beverage concentrate can be mixed with the edible liquid in a weight ratio ranging from 1:1 to 2:1, preferably about 1.3:1.

The semi-diluted beverage concentrates can be mixed with the edible liquid by simple shaking or stirring with a spoon. Dilution of the beverage concentrates containing 35% polyol polyester or more requires the use of a powered mixer, e.g. a Waring blender.

EXAMPLE I

A beverage concentrate was prepared, having the following composition:

| Ingredient | % w/w |
|---|---|
| Water | 26.2 |
| Potassium Sorbate | 0.06 |
| Xanthan Gum | 1 |
| Sucrose | 10.5 |
| Citric Acid | 0.04 |
| Polyglycerol Ester[1] | 1.8 |
| Propylene Glycol Ester[2] | 1.8 |
| Sucrose Polyester[3] | 43.5 |
| Hardened Palm oil | 10.9 |
| Milk Protein (Carnation) | 3.8 |
| Powdered Vanilla | 0.3 |
| Flavorings | 0.1 |

[1]Average 3 glycerol units, esterified with fatty acids having from 14 to 18 carbon atoms, average 1 fatty acid molecule per glycerol unit
[2]More than 85% mono palmitate ester
[3]A mixture of sucrose hexaoleate, sucrose heptaoleate and sucrose octaoleate Potassium sorbate, xanthan gum, sucrose and citric acid were dissolved in water of 65° C. in a Hobart mixer. Polyglycerol ester and propylene glycol ester were added and mixed in. The hardened palm oil was mixed with the sucrose polyester at 65° C. and added to the aqueous solution.

The emulsion was cooled to 26° C. At that temperature the milk protein, powdered vanilla and flavorings were mixed in.

The resulting beverage concentrate had marshmallow cream consistency. The emulsion was mixed with milk in a 1:2.5 (w/w) ratio in a Waring blender to give a highly palatable, agreeable tasting milkshake-like beverage.

EXAMPLE II

A semi-diluted beverage concentrate of the following composition was prepared:

| Ingredient | % w/w |
|---|---|
| Water | 63.25 |
| Potassium Sorbate | 0.03 |
| Xanthan Gum | 0.5 |
| Sucrose | 5.25 |
| Citric Acid | 0.024 |
| Polyglycerol Ester[1] | 0.9 |
| Propylene Glycol Ester[2] | 0.9 |
| Sucrose Polyester[3] | 21.8 |
| Hardened Palm oil | 5.4 |
| Milk Protein (Carnation) | 1.9 |
| Powdered Vanilla | 0.15 |
| Flavorings | 0.05 |

[1]Average 3 glycerol units, esterified with fatty acids having from 14 to 18 carbon atoms, average 1 fatty acid molecule per glycerol unit
[2]More than 85% mono palmitate ester
[3]A mixture of sucrose hexaoleate, sucrose heptaoleate and sucrose octaoleate The method of preparation was the same as in Example I, except that the sucrose polyester and the hardened palm oil were added separately. The resulting emulsion was a viscous liquid. The emulsion was mixed with milk in a 1.3:1 (w/w) ratio by stirring with a spoon to give a highly palatable, agreeable tasting milkshake-like beverage.

EXAMPLE III

The following beverage concentrate compositions are prepared, using the method of Example I.

| Ingredient | Composition (% w/w) | | | | | | |
|---|---|---|---|---|---|---|---|
| | I | II | III | IV | V | VI | VII |
| Glucose tetraoleate | 35 | — | — | 20 | 40 | — | 30 |
| Sucrose polylinoleate[1] | — | 60 | — | 20 | — | 40 | — |

-continued

| Ingredient | Composition (% w/w) | | | | | | |
|---|---|---|---|---|---|---|---|
| | I | II | III | IV | V | VI | VII |
| Sucrose polyester[2] | — | — | 50 | 20 | — | — | 30 |
| Cocoa butter | — | — | 5 | 5 | 20 | — | 4 |
| SOO[3] | — | 12 | — | 5 | — | 4 | 2 |
| PSS[4] | 16 | — | — | 5 | — | — | 2 |
| Polyglycerol ester[5] | 0.5 | 1.2 | 0.8 | 0.9 | 3 | 3 | 1 |
| PGMS[6] | 0.7 | — | — | 0.6 | — | 1.5 | 1 |
| BDMP[7] | — | 0.6 | 1.5 | 0.6 | — | 1.5 | — |
| Sucrose | 5 | — | 15 | — | — | 2.5 | — |
| Fructose | 5 | 5 | — | 7 | 15 | 2.5 | 10 |
| Water | BALANCE | | | | | | |

[1]A mixture of sucrose tetralinoleate, sucrose pentalinoleate, sucrose hexalinoleate, sucrose heptalinoleate and sucrose octalinoleate
[2]A mixture of the tetra-, penta-, hexa-, hepta-, and octa- esters of sucrose and soybean oil fatty acids (unsaturated)
[3]1-stearoyl diolein glycerol
[4]1-palmitoyl distearin glycerol
[5]A mixture of polyglycerol esters having from 2 to 10 glycerol units esterified with from 1 to 3 fatty acyl groups of from 14 to 18 carbon atoms per glycerol moiety
[6]Propylene glycol monostearate
[7]1,3 Butanediol monopalmitate The following milkshake-like beverages are prepared by mixing the emulsion concentrates with an edible liquid in a Waring Blender.

| Ingredient (g) | Emulsion Concentrate | | | | | | |
|---|---|---|---|---|---|---|---|
| | I | II | III | IV | V | VI | VII |
| Emulsion Concentrate | 40 | 50 | 45 | 40 | 60 | 50 | 50 |
| Skim Milk | 100 | — | — | — | — | — | — |
| Orange Juice | — | 100 | — | — | — | — | — |
| Water | — | — | 100 | — | — | — | — |
| Coffee | — | — | — | 120 | — | — | — |
| KOOL-AID[1] | — | — | — | — | 130 | — | — |
| Tea | — | — | — | — | — | 110 | — |
| Buttermilk | — | — | — | — | — | — | 135 |

[1]Strawberry flavor, prepared following directions for use supplied by manufacturer.

The beverages are highly palatable and have an agreeable taste.

EXAMPLE IV

The following semi-diluted beverage concentrate compositions are prepared, using the method of Example II.

| Ingredient | Composition (% w/w) | | | | |
|---|---|---|---|---|---|
| | I | II | III | IV | V |
| Xylitol pentaoleate | 16 | — | — | 10 | — |
| Sorbitol hexalinoleate | — | 12 | — | 10 | 21 |
| Glucose polyester[1] | — | 12 | 30 | 10 | — |
| Sodium stearate | 4 | — | — | 2 | — |
| Hardened palm oil | — | 8 | — | 2 | — |
| Behenic acid | — | 1.5 | 8 | 2 | 5 |
| Polyglycerol ester | 0.7 | 1.0 | 1.5 | 1.3 | 0.3 |
| Propylene glycol monopalmitate | 0.7 | — | 0.7 | 1.3 | 0.3 |
| Pentane diol monostearate | — | 1.5 | — | — | — |
| Sucrose | 4 | — | 7 | 2 | — |
| Dextrose | — | 4 | — | 2 | 6 |
| Saccharine | — | 0.2 | — | — | — |
| Water | BALANCE | | | | |

[1]A mixture of glucose pentaricinoleate and glucose pentalinoleate.

The following milkshake-like beverages are prepared by mixing the semi-diluted liquid, followed by stirring with a spoon.

| Ingredient (g) | Emulsion Concentrate[1] | | | | |
|---|---|---|---|---|---|
| | I | II | III | IV | V |
| Emulsion Concentrate[1] | 80 | 100 | 90 | 120 | 100 |
| Water | 60 | — | — | — | — |
| Grape Juice | — | 50 | — | — | — |
| Lemonade | — | — | 70 | — | — |
| TANG[2] | — | — | — | 70 | — |
| Dutch Cocoa[3] | — | — | — | — | 85 |

[1]semi-diluted
[2]instant, vitamin C fortified orange juice analogue
[3]instant chocolate milk analogue The beverages are highly palatable and have an agreeable taste.

What is claimed is:

1. A dietary beverage concentrate, comprising an emulsion of:
   (a) from about 35% to about 60% of a non-absorbable, non-digestible liquid polyol fatty acid polyester having at least 4 fatty acid ester groups, wherein the polyol is selected from the group consisting of sugars and sugar alcohols containing from 4 to 8 hydroxyl groups and wherein each fatty acid group has from about 8 to about 22 carbon atoms; and
   (b) from about 10% to about 50% by weight of the polyol fatty acid polyester of a fatty acid having a melting point of 37° C. or higher, or an ester of such fatty acids;
   (c) from about 0.5% to about 3% of a polyglycerol fatty acid emulsifier having an average of from 2 to 10 glycerol units and from 1 to 3 fatty acyl groups of from 14 to 18 carbon atoms per glycerol unit; and
   (d) from about 0.5% to about 3% of a fatty acid monoester of an aliphatic diol having from about 3 to about 5 carbon atoms in the diol moiety; and
   (e) from about 5% to about 15% of a saccharide; and
   (f) the balance comprising water and flavorings.

2. The emulsion concentrate of claim 1 wherein the polyglycerol fatty acid ester has an average of from 2 to 3 glycerol units and an average of 1 fatty acyl group with from 14 to 18 carbon atoms per glycerol moiety.

3. The beverage concentrate of claim 1 wherein the aliphatic diol monoester is a propylene glycol monoester.

4. The beverage concentrate of claim 1 wherein the saccharides are selected from the group consisting of fructose, dextrose, sucrose and mixtures thereof.

5. The emulsion concentrate of claim 1 wherein the amount of component (b) equals from about 20% by weight to about 30% by weight of the polyol polyester.

6. The beverage concentrate of claim 1 wherein the ester of fatty acids having a melting point of 37° C. or higher is selected from the group consisting of hydrogenated palm oil, natural cocoa butter, synthetic cocoa butter and mixtures thereof.

7. The beverage concentrate of claim 1 wherein the polyol polyester is selected from the group consisting of sucrose hexaoleate, sucrose heptaoleate, sucrose octaoleate and mixtures thereof.

8. A beverage concentrate comprising an emulsion of:
   (a) from about 40% to about 45% of a polyol polyester selected from the group consisting of sucrose hexaoleate, sucrose heptaoleate, sucrose octaoleate and mixtures thereof; and (b) from about 10% to about 12% of an anti-anal leakage agent selected from the group consisting of hydrogenated palm oil, natural cocoa butter, synthetic cocoa butter and mixtures thereof; and (c) from about 1.5% to about 2% of a polyglycerol ester having an average of from 2 to 3 glycerol units and an average of 1 fatty acyl group with from 14 to 18 carbon atoms per glycerol unit;

(d) from about 1.5% to about 2% of a fatty acid monoester of propylene glycol;

(e) from about 8% to about 12% of a saccharide selected from the group consisting of fructose, dextrose, sucrose and mixtures thereof;

(f) the balance comprising water and flavorings.

9. A semi-diluted polyol polyester beverage concentrate comprising:

(a) from about 20% to about 23% of a polyol polyester selected from the group consisting of sucrose hexaoleate, sucrose heptaoleate, sucrose octaoleate and mixtures thereof; and (b) from about 5% to about 7% of an anti-anal leakage agent selected from the group consisting of hydrogenated palm oil, natural cocoa butter, synthetic cocoa butter and mixtures thereof; and (c) from about 0.7% to about 1% of a polyglycerol ester having an average of from 2 to 3 glycerol units and an average of 1 fatty acyl group with from 14 to 18 carbon atoms per glycerol unit;

(d) from about 0.7% to about 1% of a fatty acid monoester of propylene glycol;

(e) from about 4% to about 6% saccharides selected from the group consisting of fructose, dextrose, sucrose and mixtures thereof;

(f) the balance comprising water and flavorings.

10. A polyol polyester beverage concentrate consisting of:

(a) from about 40% to about 45% of a polyol polyester selected from the group consisting of sucrose hexaoleate, sucrose heptaoleate, sucrose octaoleate, and mixtures thereof;

(b) from about 10% to about 12% hardened palm oil;

(c) from about 1.5% to about 2% of a polyglycerol ester having an average of from 2 to 3 glycerol units and an average of 1 fatty acyl group with from 14 to 18 carbon atoms per glycerol unit;

(d) from about 1.5% to about 2% of a fatty mono ester of propylene glycol;

(e) from about 8% to about 12% sucrose;

(f) from about 0.05% to about 0.07% potassium sorbate;

(g) from about 0.8% to about 1.2% xanthan gum;

(h) from about 0.03% to about 0.05% citric acid;

(i) from about 0.2% to about 0.4% powdered vanilla;

(j) from about 3.5% to about 4.2% milk protein;

(k) about 0.12% flavorings; and (l) the balance water.

11. A semi-diluted beverage concentrate consisting of:

(a) from about 20% to about 23% of a polyol polyester selected from the group consisting of sucrose hexaoleate, sucrose heptaoleate, sucrose octaoleate, and mixtures thereof;

(b) from about 5% to about 7% hardened palm oil;

(c) from about 0.7% to about 1.0% of a polyglycerol ester having an average of from 2 to 3 glycerol units and an average of 1 fatty acyl group with from 14 to 18 carbon atoms per glycerol unit;

(d) from about 0.7% to about 1.0% of a fatty mono ester of propylene glycol;

(e) from about 4% to about 6% sucrose;

(f) from about 0.02% to about 0.04% potassium sorbate;

(g) from about 0.4% to about 0.6% xanthan gum;

(h) from about 0.02% to about 0.04% citric acid;

(i) from about 0.1% to about 0.2% powdered vanilla;

(j) from about 1.7% to about 2.1% milk protein;

(k) about 0.06% flavorings; and (l) the balance water.

12. The beverage prepared from the beverage concentrate of claim 1 by diluting said concentrate with an edible liquid.

13. The beverage prepared from the beverage concentrate of claim 8 by diluting said concentrate with an edible liquid in a weight ratio ranging from 1:2 to 1:3.

14. The beverage prepared from the semi-diluted beverage concentrate of claim 9 by further diluting said concentrate with an edible liquid in a weight ratio ranging from 1:1 to 2:1.

15. The beverage prepared from the beverage concentrate of claim 8 by diluting said concentrate with an edible liquid selected from the group consisting of milk, water, lemonade, fruit juice, and mixtures thereof in a weight ratio ranging from 1:2 to 1:3.

16. The beverage prepared from the semi-diluted beverage concentrate of claim 9 by further diluting said concentrate with an edible liquid selected from the group consisting of milk, water, lemonade, fruit juice and mixtures thereof in a weight ratio ranging from 1:1 to 2:1.

* * * * *